United States Patent
Mikami et al.

(10) Patent No.: US 11,322,996 B2
(45) Date of Patent: May 3, 2022

(54) MOTOR

(71) Applicant: DENSO CORPORATION, Kariya (JP)

(72) Inventors: Koji Mikami, Kariya (JP); Akihiro Utsumi, Kariya (JP); Yoshiaki Takemoto, Kariya (JP); Koji Hotta, Kariya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 16/967,379

(22) PCT Filed: Mar. 26, 2019

(86) PCT No.: PCT/JP2019/012913
§ 371 (c)(1),
(2) Date: Aug. 4, 2020

(87) PCT Pub. No.: WO2019/189208
PCT Pub. Date: Oct. 3, 2019

(65) Prior Publication Data
US 2021/0218299 A1   Jul. 15, 2021

(30) Foreign Application Priority Data

Mar. 27, 2018 (JP) .............................. JP2018-060407
Mar. 27, 2018 (JP) .............................. JP2018-060408

(51) Int. Cl.
*H02K 1/27* (2022.01)
*H02K 21/16* (2006.01)
(Continued)

(52) U.S. Cl.
CPC ........... *H02K 1/276* (2013.01); *H02K 1/2746* (2013.01); *H02K 21/16* (2013.01); *H02K 2201/15* (2013.01); *H02K 2213/03* (2013.01)

(58) Field of Classification Search
CPC ...... H02K 1/276; H02K 1/2746; H02K 21/16; H02K 2201/15; H02K 2213/03
See application file for complete search history.

(56) References Cited

U.S. PATENT DOCUMENTS

| 2009/0224627 A1 | 9/2009 | Hino et al. | |
| 2011/0062814 A1* | 3/2011 | Adaniya | H02K 29/03 310/156.53 |

(Continued)

FOREIGN PATENT DOCUMENTS

| JP | 2005-287299 A | 10/2005 |
| JP | 2008-109799 A | 5/2008 |
| JP | 5256147 B2 | 8/2013 |

OTHER PUBLICATIONS

Jun. 11, 2019 International Search Report issued in International Patent Application No. PCT/JP2019/012913.

*Primary Examiner* — Thomas Truong
(74) *Attorney, Agent, or Firm* — Oliff PLC

(57) ABSTRACT

A motor includes a rotation shaft, a rotor, and a stator. The rotor includes a rotor core and magnetic pole portions respectively including permanent magnets embedded in the rotor core. The magnetic pole portions have polarities that differ alternately in a circumferential direction. A projection projecting radially outward from an outer circumferential portion of the rotor core is arranged between the magnetic pole portions having different polarities. In a radial opposing relationship of the rotor core and the teeth taken at different times while the rotor is revolved once, at a certain time, a quantity of the teeth that oppose one of the magnetic pole portions and do not oppose the projection is greater than a quantity of the teeth that simultaneously oppose two of the magnetic pole portions adjacent to each other in the circumferential direction and the projection located in between the magnetic pole portions.

8 Claims, 12 Drawing Sheets

(51) Int. Cl.
*H02K 1/276* (2022.01)
*H02K 1/2746* (2022.01)

(56) References Cited

U.S. PATENT DOCUMENTS

| | | | |
|---|---|---|---|
| 2012/0267975 A1* | 10/2012 | Nishimura | H02K 1/276 |
| | | | 310/156.01 |
| 2012/0274160 A1 | 11/2012 | Hino et al. | |
| 2013/0207508 A1* | 8/2013 | Tomohara | H02K 1/278 |
| | | | 310/216.092 |
| 2014/0184009 A1* | 7/2014 | Taniguchi | H02K 1/2746 |
| | | | 310/156.53 |
| 2018/0219438 A1 | 8/2018 | Oikawa et al. | |

* cited by examiner

Rotational Angle (Electrical Angle): 6 Degrees

Fig.2

| Rotational Angle (Electrical Angle) | Tooth Number | | | | | | | | | | | | Quantity of Teeth | | |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| 6 | A | B | B | C | B | B | A | B | B | C | B | B | 2 | 8 | 2 |
| 12 | A | B | B | C | B | B | A | B | B | C | B | B | 2 | 8 | 2 |
| 18 | A | B | B | C | B | A | A | B | B | C | B | A | 4 | 6 | 2 |
| 24 | A | B | C | B | B | A | A | B | C | B | B | A | 4 | 6 | 2 |
| 30 | A | B | C | B | B | A | A | B | C | B | B | A | 4 | 6 | 2 |
| 36 | B | B | C | B | B | A | B | B | C | B | B | A | 2 | 8 | 2 |
| 42 | B | B | C | B | B | A | B | B | C | B | B | A | 2 | 8 | 2 |
| 48 | B | B | C | B | A | A | B | B | C | B | A | A | 4 | 6 | 2 |
| 54 | B | C | B | B | A | A | B | C | B | B | A | A | 4 | 6 | 2 |
| 60 | B | C | B | B | A | A | B | C | B | B | A | A | 4 | 6 | 2 |
| 66 | B | C | B | B | A | B | B | C | B | B | A | B | 2 | 8 | 2 |
| 72 | B | C | B | B | A | B | B | C | B | B | A | B | 2 | 8 | 2 |
| 78 | B | C | B | A | A | B | B | C | B | A | A | B | 4 | 6 | 2 |
| 84 | C | B | B | A | A | B | C | B | B | A | A | B | 4 | 6 | 2 |
| 90 | C | B | B | A | A | B | C | B | B | A | A | B | 4 | 6 | 2 |
| 96 | C | B | B | A | B | B | C | B | B | A | B | B | 2 | 8 | 2 |
| 102 | C | B | B | A | B | B | C | B | B | A | B | B | 2 | 8 | 2 |
| ... | | | | | | | | | | | | | | | |
| 264 | C | B | B | A | A | B | C | B | B | A | A | B | 4 | 6 | 2 |
| 270 | C | B | B | A | A | B | C | B | B | A | A | B | 4 | 6 | 2 |
| 276 | C | B | B | A | B | B | C | B | B | A | B | B | 2 | 8 | 2 |
| 282 | C | B | B | A | B | B | C | B | B | A | B | B | 2 | 8 | 2 |
| 288 | C | B | A | A | B | B | C | B | A | A | B | B | 4 | 6 | 2 |
| 294 | B | B | A | A | B | C | B | B | A | A | B | C | 4 | 6 | 2 |
| 300 | B | B | A | A | B | C | B | B | A | A | B | C | 4 | 6 | 2 |
| 306 | B | B | A | B | B | C | B | B | A | B | B | C | 2 | 8 | 2 |
| 312 | B | B | A | B | B | C | B | B | A | B | B | C | 2 | 8 | 2 |
| 318 | B | A | A | B | B | C | B | A | A | B | B | C | 4 | 6 | 2 |
| 324 | B | A | A | B | C | B | B | A | A | B | C | B | 4 | 6 | 2 |
| 330 | B | A | A | B | C | B | B | A | A | B | C | B | 4 | 6 | 2 |
| 336 | B | A | B | B | C | B | B | A | B | B | C | B | 2 | 8 | 2 |
| 342 | B | A | B | B | C | B | B | A | B | B | C | B | 2 | 8 | 2 |
| 348 | A | A | B | B | C | B | A | A | B | B | C | B | 4 | 6 | 2 |
| 354 | A | A | B | C | B | B | A | A | B | C | B | B | 4 | 6 | 2 |
| 360 | A | A | B | C | B | B | A | A | B | C | B | B | 4 | 6 | 2 |

Rotational Angle (Electrical Angle): 18 Degrees

<Comparative Example 1>

Fig.5 <Comparative Example 1>

| Rotational Angle (Electrical Angle) | Tooth Number | | | | | | | | | | | | Quantity of Teeth | | |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| 6 | A | B | B | C | B | B | A | B | B | C | B | B | 2 | 8 | 2 |
| 12 | A | B | B | C | B | B | A | B | B | C | B | B | 2 | 8 | 2 |
| 18 | A | B | C | C | B | B | A | B | C | C | B | B | 2 | 6 | 4 |
| 24 | B | B | C | C | B | A | B | B | C | C | B | A | 2 | 6 | 4 |
| 30 | B | B | C | C | B | A | B | B | C | C | B | A | 2 | 6 | 4 |
| 36 | B | B | C | B | B | A | B | B | C | B | B | A | 2 | 8 | 2 |
| 42 | B | B | C | B | B | A | B | B | C | B | B | A | 2 | 8 | 2 |
| 48 | B | C | C | B | B | A | B | C | C | B | B | A | 2 | 6 | 4 |
| 54 | B | C | C | B | A | B | B | C | C | B | A | B | 2 | 6 | 4 |
| 60 | B | C | C | B | A | B | B | C | C | B | A | B | 2 | 6 | 4 |
| 66 | B | C | B | B | A | B | B | C | B | B | A | B | 2 | 8 | 2 |
| 72 | B | C | B | B | A | B | B | C | B | B | A | B | 2 | 8 | 2 |
| 78 | C | C | B | B | A | B | C | C | B | B | A | B | 2 | 6 | 4 |
| 84 | C | C | B | A | B | B | C | C | B | A | B | B | 2 | 6 | 4 |
| 90 | C | C | B | A | B | B | C | C | B | A | B | B | 2 | 6 | 4 |
| 96 | C | B | B | A | B | B | C | B | B | A | B | B | 2 | 8 | 2 |
| 102 | C | B | B | A | B | B | C | B | B | A | B | B | 2 | 8 | 2 |
| ⋮ | | | | | | | | | | | | | | | |
| 264 | C | C | B | A | B | B | C | C | B | A | B | B | 2 | 6 | 4 |
| 270 | C | C | B | A | B | B | C | C | B | A | B | B | 2 | 6 | 4 |
| 276 | C | B | B | A | B | B | C | B | B | A | B | B | 2 | 8 | 2 |
| 282 | C | B | B | A | B | B | C | B | B | A | B | B | 2 | 8 | 2 |
| 288 | C | B | B | A | B | C | C | B | B | A | B | C | 2 | 6 | 4 |
| 294 | C | B | A | B | B | C | C | B | A | B | B | C | 2 | 6 | 4 |
| 300 | C | B | A | B | B | C | C | B | A | B | B | C | 2 | 6 | 4 |
| 306 | B | B | A | B | B | C | B | B | A | B | B | C | 2 | 8 | 2 |
| 312 | B | B | A | B | B | C | B | B | A | B | B | C | 2 | 8 | 2 |
| 318 | B | B | A | B | C | C | B | B | A | B | C | C | 2 | 6 | 4 |
| 324 | B | A | B | B | C | C | B | A | B | B | C | C | 2 | 6 | 4 |
| 330 | B | A | B | B | C | C | B | A | B | B | C | C | 2 | 6 | 4 |
| 336 | B | A | B | B | C | B | B | A | B | B | C | B | 2 | 8 | 2 |
| 342 | B | A | B | B | C | B | B | A | B | B | C | B | 2 | 8 | 2 |
| 348 | B | A | B | C | C | B | B | A | B | C | C | B | 2 | 6 | 4 |
| 354 | A | B | B | C | C | B | A | B | B | C | C | B | 2 | 6 | 4 |
| 360 | A | B | B | C | C | B | A | B | B | C | C | B | 2 | 6 | 4 |

<Comparative Example 2>

Fig.7 <Comparative Example 2>

| Rotational Angle (Electrical Angle) | \multicolumn{12}{c|}{Tooth Number} | \multicolumn{3}{c|}{Quantity of Teeth} |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| 6 | A | A | B | C | B | B | A | A | B | C | B | B | 4 | 6 | 2 |
| 12 | A | B | B | C | B | A | A | B | B | C | B | A | 4 | 6 | 2 |
| 18 | A | B | B | C | B | A | A | B | B | C | B | A | 4 | 6 | 2 |
| 24 | A | B | B | B | B | A | A | B | B | B | B | A | 4 | 8 | 0 |
| 30 | A | B | C | B | B | A | A | B | C | B | B | A | 4 | 6 | 2 |
| 36 | A | B | C | B | B | A | A | B | C | B | B | A | 4 | 6 | 2 |
| 42 | B | B | C | B | A | A | B | B | C | B | A | A | 4 | 6 | 2 |
| 48 | B | B | C | B | A | A | B | B | C | B | A | A | 4 | 6 | 2 |
| 54 | B | B | B | B | A | A | B | B | B | B | A | A | 4 | 8 | 0 |
| 60 | B | C | B | B | A | A | B | C | B | B | A | A | 4 | 6 | 2 |
| 66 | B | C | B | B | A | A | B | C | B | B | A | A | 4 | 6 | 2 |
| 72 | B | C | B | A | A | B | B | C | B | A | A | B | 4 | 6 | 2 |
| 78 | B | C | B | A | A | B | B | C | B | A | A | B | 4 | 6 | 2 |
| 84 | B | B | B | A | A | B | B | B | B | A | A | B | 4 | 8 | 0 |
| 90 | C | B | B | A | A | B | C | B | B | A | A | B | 4 | 6 | 2 |
| 96 | C | B | B | A | A | B | C | B | B | A | A | B | 4 | 6 | 2 |
| 102 | C | B | A | A | B | B | C | B | A | A | B | B | 4 | 6 | 2 |
| ⋮ | | | | | | | | | | | | | | | |
| 264 | B | B | B | A | A | B | B | B | B | A | A | B | 4 | 8 | 0 |
| 270 | C | B | B | A | A | B | C | B | B | A | A | B | 4 | 6 | 2 |
| 276 | C | B | B | A | A | B | C | B | B | A | A | B | 4 | 6 | 2 |
| 282 | C | B | A | A | B | B | C | B | A | A | B | B | 4 | 6 | 2 |
| 288 | C | B | A | A | B | B | C | B | A | A | B | B | 4 | 6 | 2 |
| 294 | B | B | A | A | B | B | B | B | A | A | B | B | 4 | 8 | 0 |
| 300 | B | B | A | A | B | C | B | B | A | A | B | C | 4 | 6 | 2 |
| 306 | B | B | A | A | B | C | B | B | A | A | B | C | 4 | 6 | 2 |
| 312 | B | A | A | B | B | C | B | A | A | B | B | C | 4 | 6 | 2 |
| 318 | B | A | A | B | B | C | B | A | A | B | B | C | 4 | 6 | 2 |
| 324 | B | A | A | B | B | B | B | A | A | B | B | B | 4 | 8 | 0 |
| 330 | B | A | A | B | C | B | B | A | A | B | C | B | 4 | 6 | 2 |
| 336 | B | A | A | B | C | B | B | A | A | B | C | B | 4 | 6 | 2 |
| 342 | A | A | B | B | C | B | A | A | B | B | C | B | 4 | 6 | 2 |
| 348 | A | A | B | B | C | B | A | A | B | B | C | B | 4 | 6 | 2 |
| 354 | A | A | B | B | B | B | A | A | B | B | B | B | 4 | 8 | 0 |
| 360 | A | A | B | C | B | B | A | A | B | C | B | B | 4 | 6 | 2 |

Rotational Angle (Electrical Angle): 6 Degrees

Fig.13

| Rotational Angle (Electrical Angle) | Tooth Number | | | | | | | | | | | | Quantity of Teeth | | |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| 6 | A | B | A | C | B | A | B | A | C | C | A | B | 5 | 4 | 3 |
| 12 | A | B | A | C | B | A | B | A | C | C | A | B | 5 | 4 | 3 |
| 18 | A | B | A | C | B | A | B | A | C | C | A | B | 5 | 4 | 3 |
| 24 | A | B | A | C | B | A | B | A | C | C | A | B | 5 | 4 | 3 |
| 30 | A | C | C | A | B | A | B | A | C | B | A | B | 5 | 4 | 3 |
| 36 | A | C | C | A | B | A | B | A | C | B | A | B | 5 | 4 | 3 |
| 42 | A | C | C | A | B | A | B | A | C | B | A | B | 5 | 4 | 3 |
| 48 | A | C | C | A | B | A | B | A | C | B | A | B | 5 | 4 | 3 |
| 54 | A | C | C | A | B | A | B | A | C | B | A | B | 5 | 4 | 3 |
| 60 | A | C | B | A | B | A | C | C | A | B | A | B | 5 | 4 | 3 |
| 66 | A | C | B | A | B | A | C | C | A | B | A | B | 5 | 4 | 3 |
| 72 | A | C | B | A | B | A | C | C | A | B | A | B | 5 | 4 | 3 |
| 78 | A | C | B | A | B | A | C | C | A | B | A | B | 5 | 4 | 3 |
| 84 | A | C | B | A | B | A | C | C | A | B | A | B | 5 | 4 | 3 |
| 90 | C | A | B | A | B | A | C | B | A | B | A | C | 5 | 4 | 3 |
| 96 | C | A | B | A | B | A | C | B | A | B | A | C | 5 | 4 | 3 |
| 102 | C | A | B | A | B | A | C | B | A | B | A | C | 5 | 4 | 3 |
| ⋮ | | | | | | | | | | | | | | | |
| 264 | C | C | A | B | A | B | A | C | B | A | B | A | 5 | 4 | 3 |
| 270 | C | B | A | B | A | C | C | A | B | A | B | A | 5 | 4 | 3 |
| 276 | C | B | A | B | A | C | C | A | B | A | B | A | 5 | 4 | 3 |
| 282 | C | B | A | B | A | C | C | A | B | A | B | A | 5 | 4 | 3 |
| 288 | C | B | A | B | A | C | C | A | B | A | B | A | 5 | 4 | 3 |
| 294 | C | B | A | B | A | C | C | A | B | A | B | A | 5 | 4 | 3 |
| 300 | A | B | A | B | A | C | B | A | B | A | C | C | 5 | 4 | 3 |
| 306 | A | B | A | B | A | C | B | A | B | A | C | C | 5 | 4 | 3 |
| 312 | A | B | A | B | A | C | B | A | B | A | C | C | 5 | 4 | 3 |
| 318 | A | B | A | B | A | C | B | A | B | A | C | C | 5 | 4 | 3 |
| 324 | A | B | A | B | A | C | B | A | B | A | C | C | 5 | 4 | 3 |
| 330 | A | B | A | C | C | A | B | A | B | A | C | B | 5 | 4 | 3 |
| 336 | A | B | A | C | C | A | B | A | B | A | C | B | 5 | 4 | 3 |
| 342 | A | B | A | C | C | A | B | A | B | A | C | B | 5 | 4 | 3 |
| 348 | A | B | A | C | C | A | B | A | B | A | C | B | 5 | 4 | 3 |
| 354 | A | B | A | C | C | A | B | A | B | A | C | B | 5 | 4 | 3 |
| 360 | A | B | A | C | B | A | B | A | C | C | A | B | 5 | 4 | 3 |

<Comparative Example 3>

MOTOR

CROSS-REFERENCE TO RELATED APPLICATION

This application is based on Japanese Patent Application No. 2018-060407 filed on Mar. 27, 2018 and Japanese Application No. 2018-060408 filed on the same date, and the contents thereof are incorporated herein by reference.

TECHNICAL FIELD

The present disclosure relates to a magnet-embedded-type motor and a motor including a consequent-pole-type rotor.

BACKGROUND ART

Patent Document 1 describes an example of a magnet-embedded-type motor (interior-permanent-magnet-type motor) in which magnetic pole portions of a rotor are formed by permanent magnets embedded in a rotor core. Further, the motor of Patent Document 1 is an all-magnet-type motor, in which the permanent magnets forming the magnetic pole portions of the rotor are alternately arranged in the circumferential direction to have different polarities.

Patent Document 2 discloses an example of a consequent-pole-type (half-magnet-type) rotor including magnetic pole portions, formed by embedded permanent magnets, and pseudo-magnetic pole portions, which are formed by parts of a rotor core and are each located relative to the magnetic pole portion with a gap located in between. The magnetic pole portions and the pseudo-magnetic pole portions are alternately arranged on an outer circumferential portion of the rotor core in the circumferential direction. The magnetic pole portions (permanent magnets) are set to have the same polarity. Further, the magnetic flux of the permanent magnets in the magnetic pole portions that are adjacent to each other in the circumferential direction results in each pseudo-magnetic pole portion having a polarity differing from the magnetic pole portions.

PRIOR ART DOCUMENTS

Patent Documents

Patent Document 1: Japanese Laid-Open Patent Publication No. 2008-109799

Patent Document 2: Japanese Laid-Open Patent Publication No. 2014-131376

SUMMARY OF THE INVENTION

In a magnet-embedded-type motor such as that of Patent Document 1, a larger saliency ratio (Lq/Ld), which is a ratio of q-axis inductance Lq to d-axis inductance Ld, will increase in the reluctance torque. However, in the magnet-embedded-type motor, for example, when current increases, q-axis inductance Lq is easily saturated. This decreases the saliency ratio in an undesirable manner.

Also, in a motor including a rotor such as that described in Patent Document 2, a larger saliency ratio (Lq/Ld) of q-axis inductance Lq to d-axis inductance Ld increases in the reluctance torque. However, in this motor, the teeth of a stator simultaneously oppose the magnetic pole portions and the pseudo-magnetic pole portions. This forms a magnetic path that short-circuits the magnetic pole portions and the pseudo-magnetic pole portions thereby decreasing q-axis inductance Lq. As a result, the saliency ratio will be decreased in an undesirable manner.

The objective of the present disclosure is to provide a motor that limits decreases in saliency ratio.

A motor in accordance with a first mode of the present disclosure includes a rotation shaft, a rotor, and a stator. The rotor includes a rotor core and magnetic pole portions. The rotor core is coaxially fixed to the rotation shaft. The magnetic pole portions respectively include permanent magnets embedded in the rotor core. The magnetic pole portions have polarities that differ alternately in a circumferential direction. The stator includes teeth and a coil. The teeth are arranged in the circumferential direction opposing an outer circumferential surface of the rotor core in a radial direction. The coil is wound around the teeth. A projection projecting radially outward from an outer circumferential portion of the rotor core is arranged between the magnetic pole portions having different polarities. In a radial opposing relationship of the rotor core and the teeth taken at different times while the rotor is revolved once, at a certain time, a quantity of the teeth that oppose one of the magnetic pole portions and do not oppose the projection is greater than a quantity of the teeth that simultaneously oppose two of the magnetic pole portions adjacent to each other in the circumferential direction and the projection located in between the magnetic pole portions.

With the above configuration, in the radial opposing relationship of the rotor core and the teeth taken at different times while the rotor is revolved once, at a certain time, the quantity of teeth that oppose one of the magnetic pole portions and do not oppose the projection is greater than the quantity of teeth that simultaneously oppose two magnetic pole portions adjacent to each other in the circumferential direction and the projection located in between the magnetic pole portions. In this manner, decreases in the saliency ratio caused by increased current are limited (refer to FIG. 8).

The motor in accordance with a second mode of the present disclosure includes a rotation shaft, a rotor, and a stator. The rotor includes a rotor core coaxially fixed to the rotation shaft. The stator includes teeth and a coil. The teeth are arranged in a circumferential direction opposing an outer circumferential surface of the rotor core in a radial direction. The coil is wound around the teeth. The rotor core includes magnetic pole portions and pseudo-magnetic pole portions. The magnetic pole portions each have an embedded permanent magnet. The pseudo-magnetic pole portions are formed by portions of the rotor core and are each located relative to the magnetic pole portion with a gap located in between. The magnetic pole portions and the pseudo-magnetic pole portions are alternately arranged on an outer circumferential portion of the rotor core in the circumferential direction. The magnetic pole portions have the same polarity and the pseudo-magnetic pole portions are magnetic poles having polarities differing from the magnetic pole portions. In a radial opposing relationship of the rotor core and the teeth taken at different times while the rotor is revolved once, at a certain time, a quantity of the teeth that oppose one of the magnetic pole portions and do not oppose the pseudo-magnetic pole portions is greater than a quantity of the teeth that simultaneously oppose one of the magnetic pole portions and one of the pseudo-magnetic pole portions arranged that are next to each other in the circumferential direction.

With the above configuration, in the radial opposing relationship of the rotor core and the teeth taken at different times while the rotor is revolved once, at a certain time, the quantity of teeth that oppose one of the magnetic pole portions and do not oppose the pseudo-magnetic pole portions is greater than the quantity of teeth that simultaneously oppose one of the magnetic pole portions and one of the pseudo-magnetic pole portions arranged next to each other in the circumferential direction. In this manner, decreases in saliency ratio are limited.

BRIEF DESCRIPTION OF THE DRAWINGS

The invention, together with objects and advantages thereof, may best be understood by reference to the following description of the presently preferred embodiment together with the accompanying drawings, in which:

FIG. 2 is a table showing the opposing relationship of a rotor core and each tooth at each rotational angle of the rotor according to the first embodiment;

FIG. 5 is a table showing the opposing relationship of a rotor core and each tooth at each rotational angle of the rotor according to comparative example 1;

FIG. 7 is a table showing the opposing relationship of a rotor core and each tooth at each rotational angle of the rotor according to comparative example 2;

FIG. 13 is a table showing the opposing relationship of a rotor core and each tooth at each rotational angle of the rotor according to the second embodiment;

MODES FOR CARRYING OUT THE INVENTION

A first embodiment of a motor will now be described.

Figure 1A:
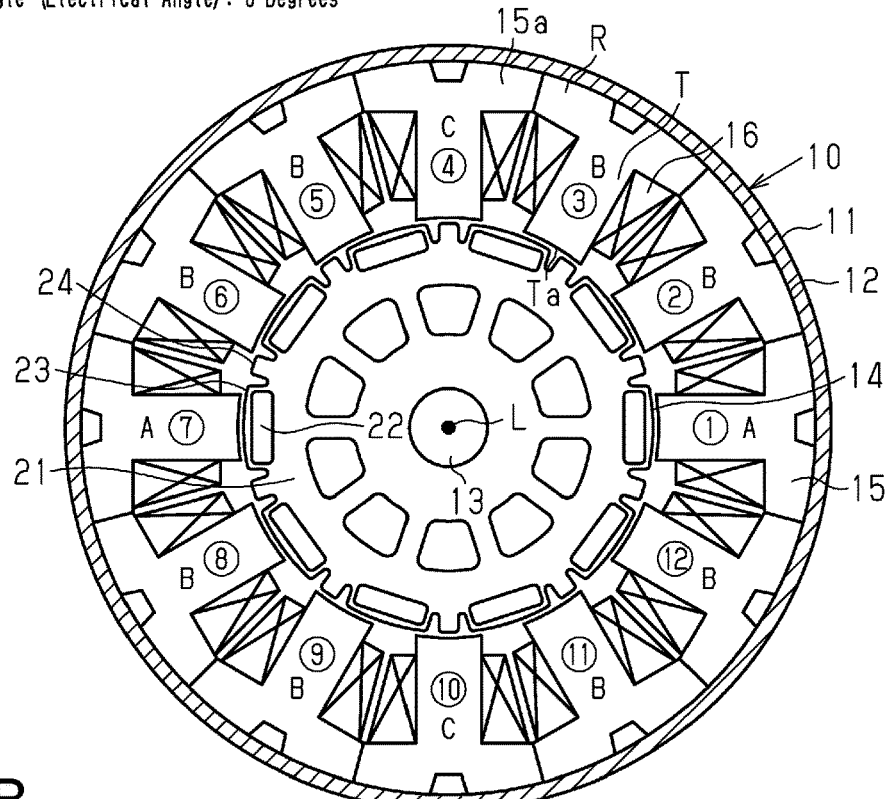
FIG. 1A is a cross-sectional view of a motor according to a first embodiment.

FIG. 1A shows a motor 10 of the present embodiment. The motor 10 that is a brushless motor of a magnet-embedded (interior permanent magnet, also known as IPM) type. The motor 10 includes a stator 12, a rotation shaft 13, and a rotor 14. The stator 12 is annular and is fixed to an inner circumferential surface of a motor housing 11. The rotation shaft 13 is arranged coaxially with the stator 12. The rotor 14 is located at a radially inner side of the stator 12 and is integrally rotatable with the rotation shaft 13. The rotation shaft 13 is supported by a bearing (not shown) to be rotatable relative to the motor housing 11.

The stator 12 includes an annular stator core 15. The stator core 15 includes an outer circumferential surface that is fixed to the motor housing 11. The stator core 15 is constructed, for example, by stacking core sheets, which are formed by electromagnetic steel sheets, in an axial direction. The stator core 15 includes a tubular annular portion R and teeth T. The annular portion R is fixed to the inner circumferential surface of the motor housing 11. The teeth T are arranged on an inner circumferential surface of the annular portion R and extend radially inward. In the present embodiment, the quantity of teeth T (i.e. quantity of slots) is twelve, and the teeth T are identically shaped. In other words, opening angle θs at a distal end (radially inner end) of each tooth T, which will be described later, is set to be the same. Further, the teeth T are arranged at equal intervals (30 degree intervals in present embodiment) in a circumferential direction. The stator core 15 of the present embodiment is separated into twelve core segments 15a, one for each tooth T. Each core segment 15a is configured to include one tooth T and part of the annular portion R.

Figure 1B:
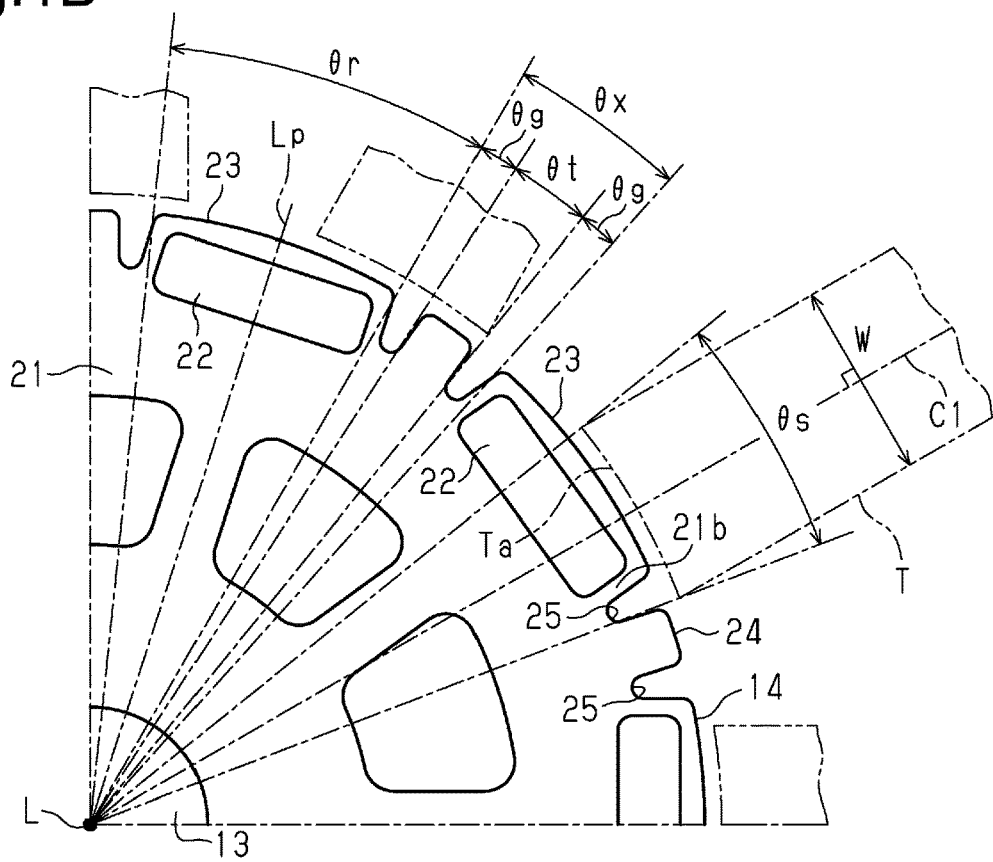
FIG. 1B is a partially enlarged plan view of a rotor of the first embodiment.

As viewed in the axial direction, each tooth T is shaped to be straight and has a constant width from a radially proximal end (outer end) to a radially distal end (inner end). More specifically, as shown in FIG. 1B, each tooth T is arranged so that width W that is orthogonal to circumferential center line C1 (line extending through circumferential center of tooth T and orthogonally to axis L of rotation shaft 13) is constant in a radial direction. In other words, each tooth T of the present embodiment does not include, for example, extensions extending from the radially inner end of the tooth T toward two opposite sides in the circumferential direction (for example, extensions Tx shown in FIG. 4). Further, a radially inner surface (distal end surface with respect to extension direction) of each tooth T is an opposing surface Ta that opposes an outer circumferential surface of the rotor 14. The opposing surface Ta of each tooth T is an arc-shaped surface that is obtained by extending an arc of a concentric circle about the axis L of the rotation shaft 13 in the axial direction.

Coils 16 of three phases are wound around the teeth T in concentrated winding. When three-phase power supply voltage is applied to the coils 16, a rotating magnetic field is formed in the stator 12. Interaction of the rotating magnetic field and the magnetic field of the rotor 14 rotates the rotor 14.

As shown in FIGS. 1A and 1B, the rotor 14 located at the inner side of the stator 12 includes a rotor core 21 and permanent magnets 22. The rotor core 21 is cylindrical (cross section is circular) and is coaxially fixed to the rotation shaft 13. The permanent magnets 22 are embedded inside the rotor core 21. The rotor core 21 is constructed, for example, by stacking core sheets, which are formed by electromagnetic steel sheets, in the axial direction.

The rotor 14 of the present embodiment includes ten identically-shaped permanent magnets 22. The permanent magnets 22 are arranged in the proximity of the outer circumferential surface of the rotor core 21 at equal intervals (36 degree intervals) in the circumferential direction. The permanent magnets 22 form magnetic pole portions 23, the polarities of which differ alternately in the circumferential direction, at the outer circumferential surface of the rotor core 21. The quantity of polarities of the rotor 14 (quantity of magnetic pole portions 23) is ten. Further, the rotor 14 is an all-magnet-type rotor that includes the permanent magnet 22 in each magnetic pole. Each permanent magnet 22 is, for example, a sintered magnet or a bonded magnet (plastic magnet, rubber magnet, or the like) obtained by mixing magnetic powder with a resin and solidifying the mixture. Further, each permanent magnet 22 of the present embodiment is substantially box-shaped and its widest surface is orthogonal to the radial direction of the rotor 14.

Each magnetic pole portion 23 (permanent magnet 22 and portion of rotor core 21 proximate to where permanent magnet 22 is embedded) is shaped identically. In other words, each magnetic pole portion 23 has the same opening angle θr, which will be described later. The magnetic pole portions 23 are set so that magnetic pole center lines Lp with respect to the circumferential direction are arranged at equal intervals (36 degree intervals) in the circumferential direction.

The rotor core 21 includes a projection 24 and two recesses 25 between two adjacent magnetic pole portions 23 having different polarities on the outer circumferential portion of the rotor core 21. The projection 24 projects radially outward. The two recesses 25 extend radially inward and are located between the projection 24 and the two magnetic pole portions 23 arranged next to the projection 24. In other words, the two circumferential sides of each magnetic pole portion 23 are arranged next to the projections 24 with the recesses 25 located in between the magnetic pole portion 23 and the projections 24. The projections 24 are identically shaped and are arranged at equal intervals (36 degree intervals) in the circumferential direction. The projection 24 and the two recesses 25 arranged at the two sides of the projection 24 are formed to be symmetric (symmetric in circumferential direction) with respect to the circumferential center of the projection 24.

Dimensional settings of the magnetic pole portions 23, the projections 24, the recesses 25, and the distal end (radially inner end) of the teeth T in the circumferential direction will now be described with reference to FIG. 1B.

An opening angle of the distal end of each tooth T (angular width between two circumferential ends of opposing surface Ta about axis L) is denoted by "θs", an opening angle of the magnetic pole portion 23 (angular width between two circumferential ends of circumferential surface of magnetic pole portion 23 about axis L) is denoted by "θr", and the dimensions are set to satisfy θs<θr. It is preferred that the two circumferential ends of the circumferential surface of the magnetic pole portion 23 that determine the opening angle θr be set at boundaries of the magnetic pole portion 23 and circumferentially adjacent magneto-resistors (gaps in recesses 25 of present embodiment).

Further, when an opening angle of the projection 24 (angular width of radially outer end of projection 24 about axis L) is denoted by "θt", and an opening angle of the recess 25 (angular width of radially outer end of recess 25 about axis L) is denoted by "θg", an opening angle between two magnetic pole portions 23 (magnetic pole portions 23 having different polarities), which are adjacent to each other in the circumferential direction (inter-magnetic portion opening angle θx), is expressed as θx=θt+(θg×2). The inter-magnetic portion opening angle θx is set to be smaller than the opening angle θs of the distal end of each tooth T. In other words, in the present embodiment, the opening angles are set to satisfy θx<θs<θr.

FIG. 2 is a table that indicates a radial opposing relationship of the rotor core 21 and each tooth T (opposing surface Ta) taken at different times when the rotor 14 is rotated toward one side of the circumferential direction (counterclockwise in FIG. 1A) in the motor 10 of the present embodiment. As shown in FIG. 1A, tooth numbers "1" to "12" are given to the teeth T in order of counterclockwise in the circumferential direction so that each tooth T can be described individually. The tooth numbers correspond to the tooth numbers shown in the table of FIG. 2.

The table of FIG. 2 shows which one of patterns "A", "B", and "C" the teeth T having tooth numbers "1" to "12" are in at each position whenever the rotor 14 is rotated counterclockwise by six degrees in electrical angle (1.2 degrees in mechanical angle). The table of FIG. 2 also shows the teeth quantities of patterns A to C at each position (rotational angle). In pattern A, the opposing surface Ta of the tooth T opposes the magnetic pole portion 23 and does not oppose the projection 24. In pattern B, the opposing surface Ta of the tooth T simultaneously opposes one magnetic pole portion 23 and one projection 24. In pattern C, the opposing surface Ta of the tooth T simultaneously opposes two magnetic pole portions 23 that are adjacent to each other in the circumferential direction (magnetic pole portions 23 having different polarities) and the projection 24 located between the two magnetic pole portions 23. Pattern B does not include pattern C.

FIG. 1A shows the motor 10 when the rotational angle (electrical angle) of the rotor 14 is 6 degrees. In this case, the teeth T having tooth numbers "1" and "7" each fully oppose a magnetic pole portion 23 (circumferential center of tooth T coincides with circumferential center of magnetic pole portion 23). Further, the teeth T having tooth numbers "4" and "10" each fully oppose a projection 24 (circumferential center of tooth T coincides with circumferential center of projection 24). In this opposing relationship of each tooth T and the rotor core 21, the teeth T having tooth numbers "1" and "7" are in pattern A, the teeth T having tooth numbers "2", "3", "5", "6", "8", "9", "11", and "12" are in pattern B, and the teeth T having tooth numbers "4" and "10" are in pattern C. In other words, the teeth quantities of patterns A to C are 2, 8, and 2, respectively.

Figure 3:
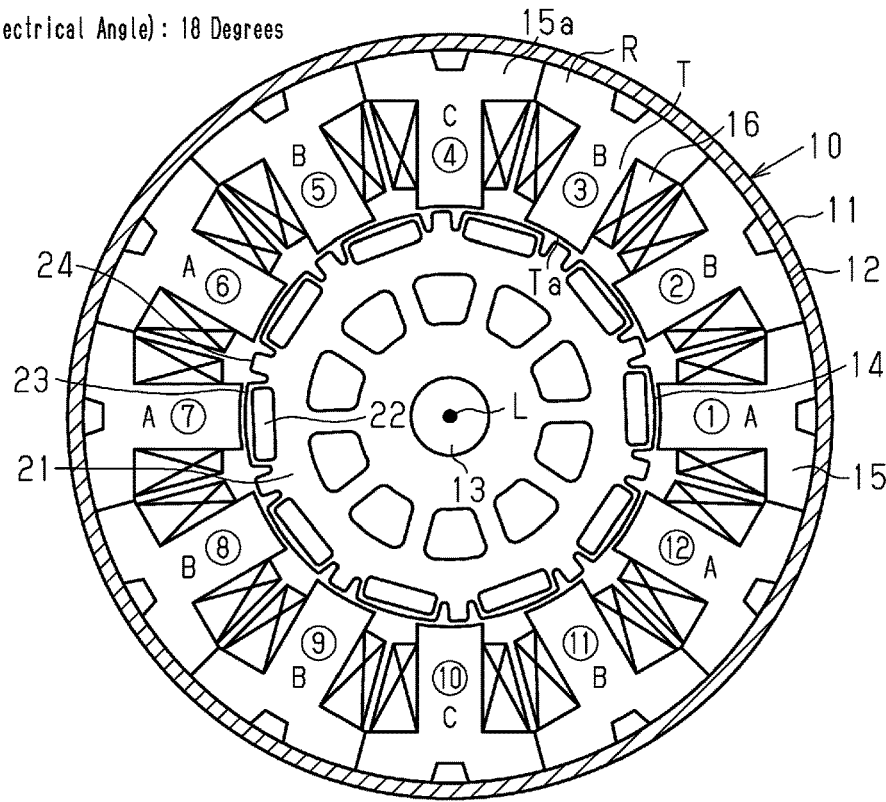
FIG. 3 is a cross-sectional view of the motor according to the first embodiment showing when the rotational angle (electrical angle) of the rotor is 18 degrees.

When the rotor 14 is rotated counterclockwise from the above state, the quantity of the teeth T in pattern A will increase to four at a certain time. For example, FIG. 3 shows the motor 10 when the rotational angle of the rotor 14 is 18 degrees in the table of FIG. 2. In this case, the four teeth T having tooth numbers "1", "6", "7", and "12" are in pattern A, the six teeth T having tooth numbers "2", "3", "5", "8", "9", and "11" are in pattern B, and the two teeth T having tooth numbers "4" and "10" are in pattern C. In other words, the two teeth T having tooth numbers "6" and "12" are shifted from pattern C to pattern A thereby increasing the quantity of teeth T in pattern A. The teeth quantities of patterns A to C are respectively 4, 6, and 2 at this degree (18 degrees) and remain the same until the rotational angle becomes 30 degrees.

In this manner, when the rotational angle of the rotor 14 is 6 degrees and 12 degrees, the teeth quantities of patterns A to C are 2, 8, and 2, respectively. Then, when the rotational angle is 18 degrees, 24 degrees, and 30 degrees, the teeth quantities of patterns A to C are 4, 6, and 2, respectively. The teeth quantities of patterns A to C change in cycles of 30 degrees in electrical angle, and the 30-degree cycle is repeated during one revolution in electrical angle (360 degrees). The rotor 14 of the present embodiment is formed by ten polarities. Thus, five revolutions in electrical angle (1800 degrees) corresponds to one revolution in mechanical angle of the rotor 14.

Comparative Example 1

Figure 4:
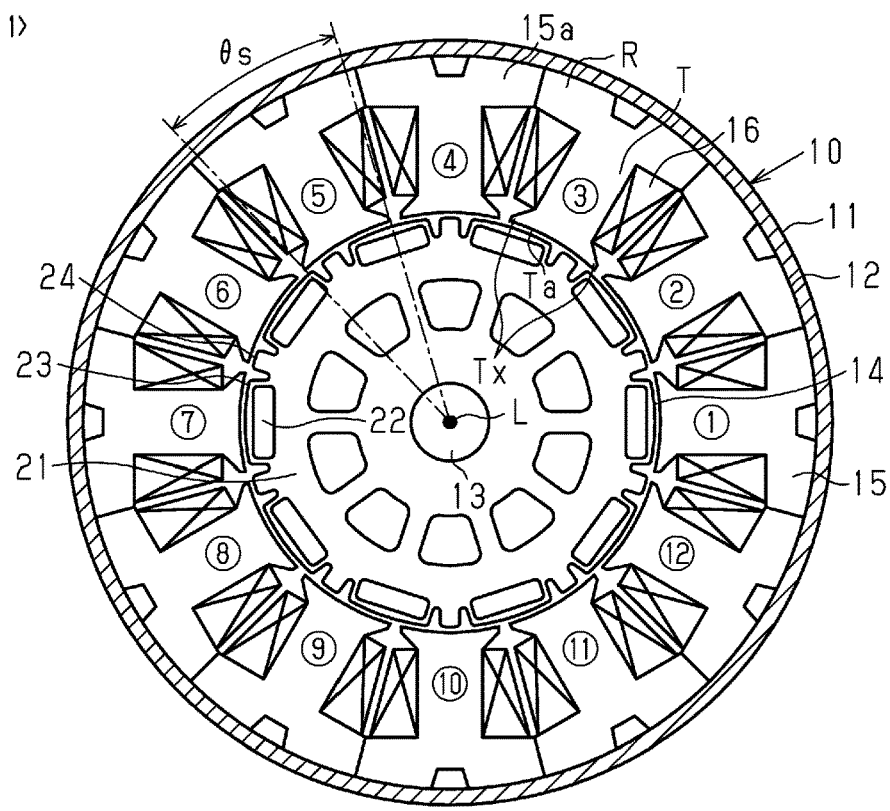
FIG. 4 is a cross-sectional view of a motor according to comparative example 1.

FIG. 4 shows the structure of comparative example 1, in which the opening angle θs of the distal end (opposing surface Ta) of each tooth T is increased from the present embodiment. The comparative example 1 uses the same rotor 14 as the present embodiment. In the structure of the comparative example 1, the relationship of the opening angle θs of each tooth T and the magnetic pole portion 23 of the rotor 14 satisfies θr<θs. Further, each tooth T of comparative example 1 includes extensions Tx that extend from the radially inner end of the tooth T toward two opposite sides of the circumferential direction. This extension Tx widens the opposing surface Ta (opening angle θs) that opposes the rotor core 21.

FIG. 5 shows a table indicating the opposing relationship of each tooth T and the rotor core 21 in comparative example 1 (in same manner as FIG. 2). In comparative example 1, teeth quantities of patterns A to C change in cycles of 30 degrees in electrical angle. While the rotor 14 is rotated 360 degrees in electrical angle, the teeth quantities of patterns B and C may respectively be 8 and 2 or 6 and 4. Nevertheless, the teeth quantity of pattern A is always two when the rotor 14 is rotated by 360 degrees in electrical angle. In other words, in comparative example 1, the teeth quantity of pattern A will never be greater than the teeth quantity of pattern C.

Comparative Example 2

Figure 6:
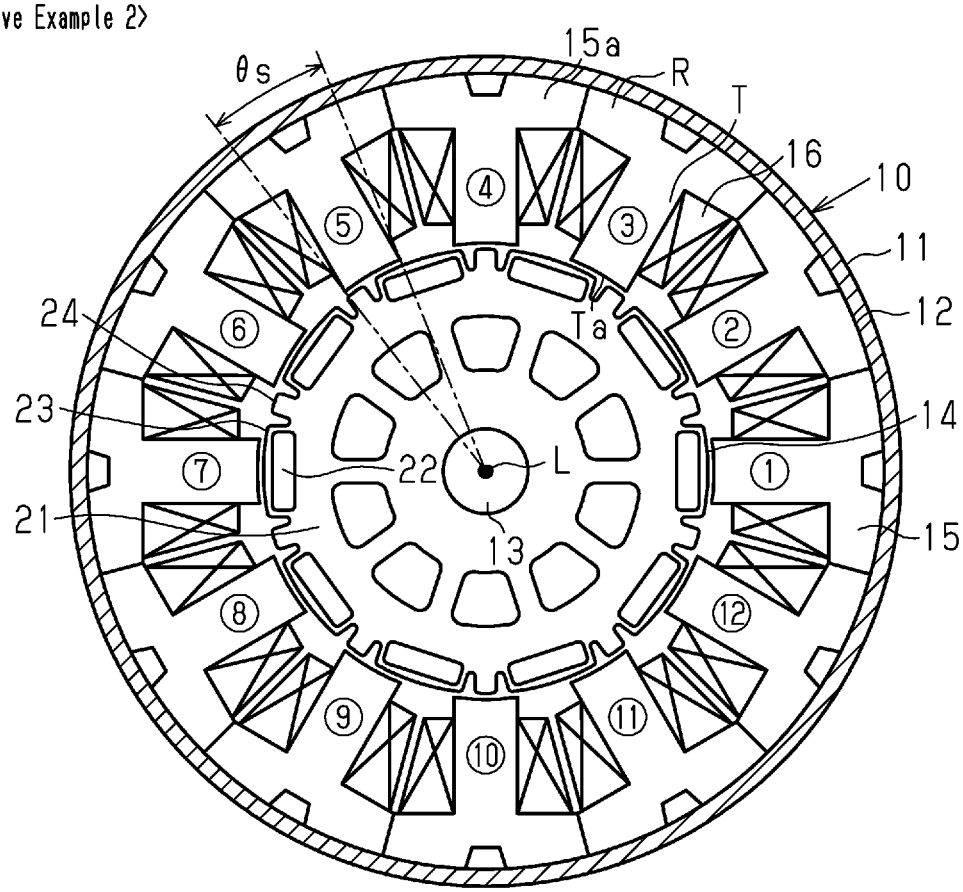
FIG. 6 is a cross-sectional view of a motor according to comparative example 2.

FIG. 6 shows the structure of comparative example 2, in which the opening angle θs of the distal end (opposing surface Ta) of each tooth T is decreased from the structure shown in FIG. 1A. The comparative example 2 uses the same rotor 14 as the present embodiment. Further, in the structure of comparative example 2, the relationship of the opening angle θs of each tooth T and the inter-magnetic portion opening angle θx of the rotor 14 satisfies θx<θs. Also, each tooth T of comparative example 2 is shaped to be straight and has a constant width in the radial direction in the same manner as each tooth T of the above embodiment (structure shown in FIG. 1A).

FIG. 7 shows a table indicating the opposing relationship of each tooth T and the rotor core 21 of comparative example 2 (in same manner as FIG. 2). In comparative example 2, the teeth quantities of patterns A to C change in cycles of 30 degrees in electrical angle. While the rotor 14 is rotated 360 degrees in electrical angle, the teeth quantities of patterns B and C are respectively 6 and 2 or 8 and 0, and the teeth quantity of pattern A is always four. In other words, in comparative example 2, while the rotor 14 is rotated 360 degrees in electrical angle (that is, while the rotor 14 is revolved once in mechanical angle), the teeth quantity of pattern A is always greater than the teeth quantity of pattern C.

The operation of the first present embodiment will now be described.

Figure 8:
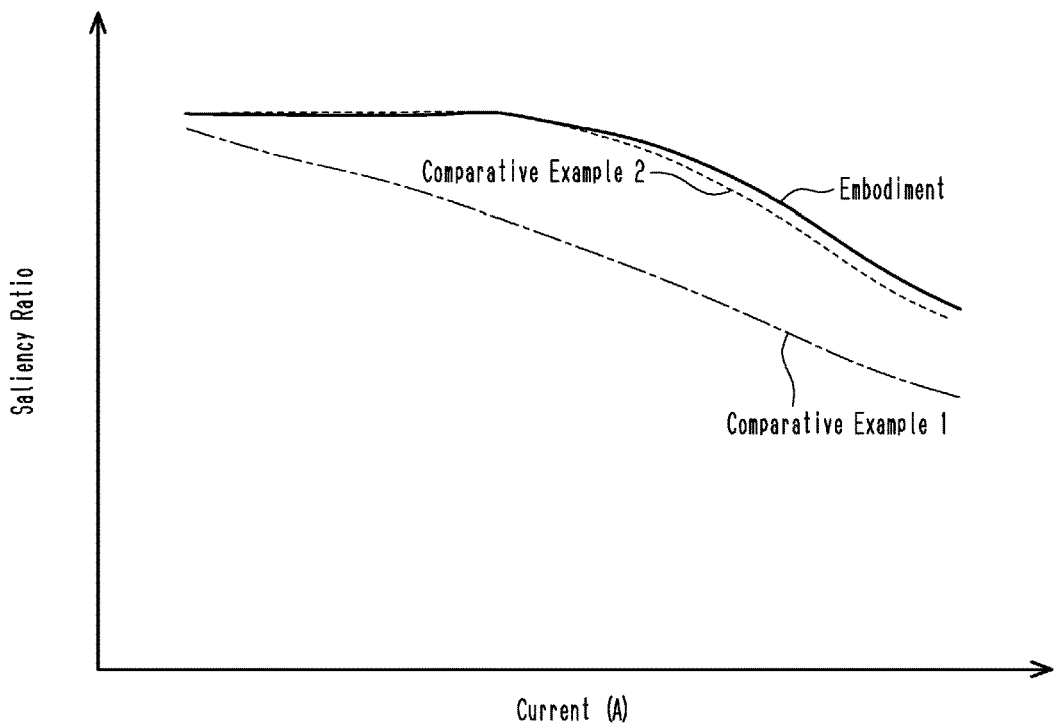
FIG. 8 is a graph showing changes in the saliency ratio in accordance with current changes in the first embodiment and comparative examples 1 and 2.

As shown in FIG. 8, when the current supplied to the coils 16 is increased, the degree of decrease in saliency ratio (Lq/Ld) of q-axis inductance Lq to d-axis inductance Ld is smaller in the embodiment (structure shown in FIG. 1A) and comparative example 2 than in comparative example 1. In the first embodiment and comparative example 2, more teeth T are in pattern A (tooth T opposing magnetic pole portion 23 and not opposing projection 24) than comparative example 1. Accordingly, when d-axis current is input, the amount of magnetic flux flowing into the projections 24 (q-axis) is decreased. In this manner, when current is increased, the degree of decrease in q-axis inductance Lq due to saturation of magnetism in the projections 24 is limited. Thus, it is considered that when current is increased, the degree of decrease in the saliency ratio is smaller in the first embodiment and comparative example 2 than in the comparative example 1. Further, in the first embodiment and comparative example 2, the formation of a magnetic circuit across d-axis and q-axis is hindered. This limits magnetic interference between d-axis and q-axis. As a result, the difference between q-axis inductance Lq and d-axis inductance Ld is ensured, thereby limiting decreases in the saliency ratio in a further preferred manner.

Figure 9:
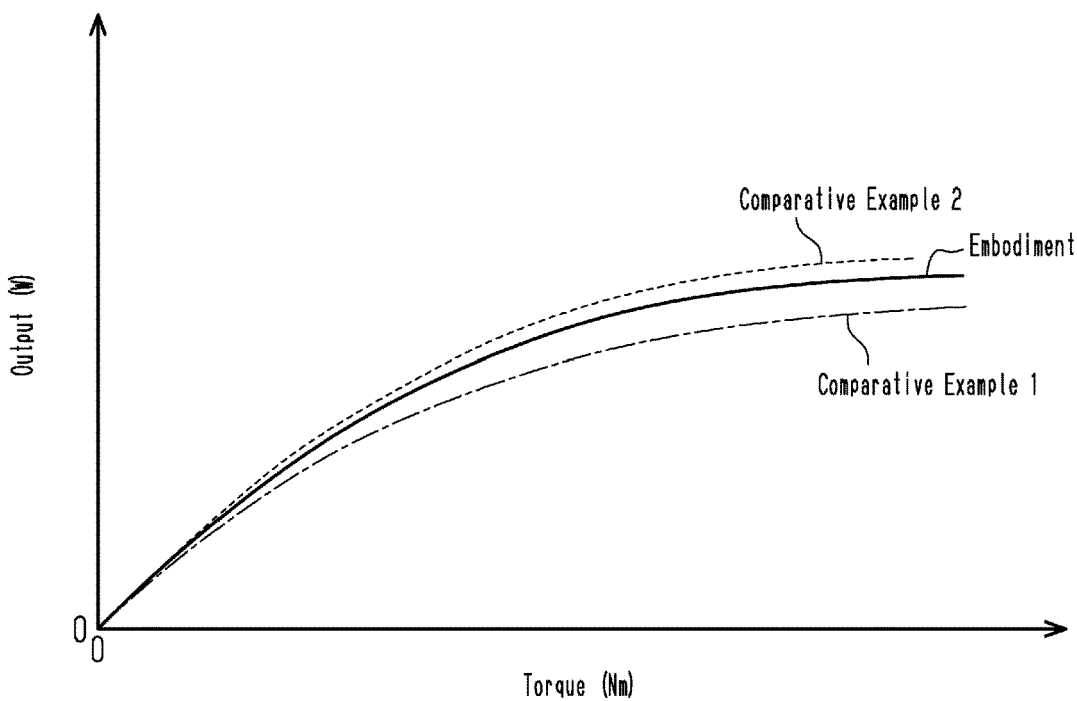
FIG. 9 is a graph showing changes in output in accordance with torque changes in the first embodiment and comparative examples 1 and 2.

As shown in FIG. 9, the output (rotational speed at same torque) is higher in the first embodiment and comparative example 2 than comparative example 1. It is considered that this improvement resulted from the effect of further limiting decreases in the saliency ratio in the first embodiment and comparative example 2 from comparative example 1 when current is increased.

In a comparison of the structures of the first embodiment and comparative example 2, as shown in FIG. 8, the degree of decrease in the saliency ratio is smaller in the first embodiment. Further, as shown in FIG. 9, the output (rotational speed at same torque) is greater in comparative example 2.

Figure 10:
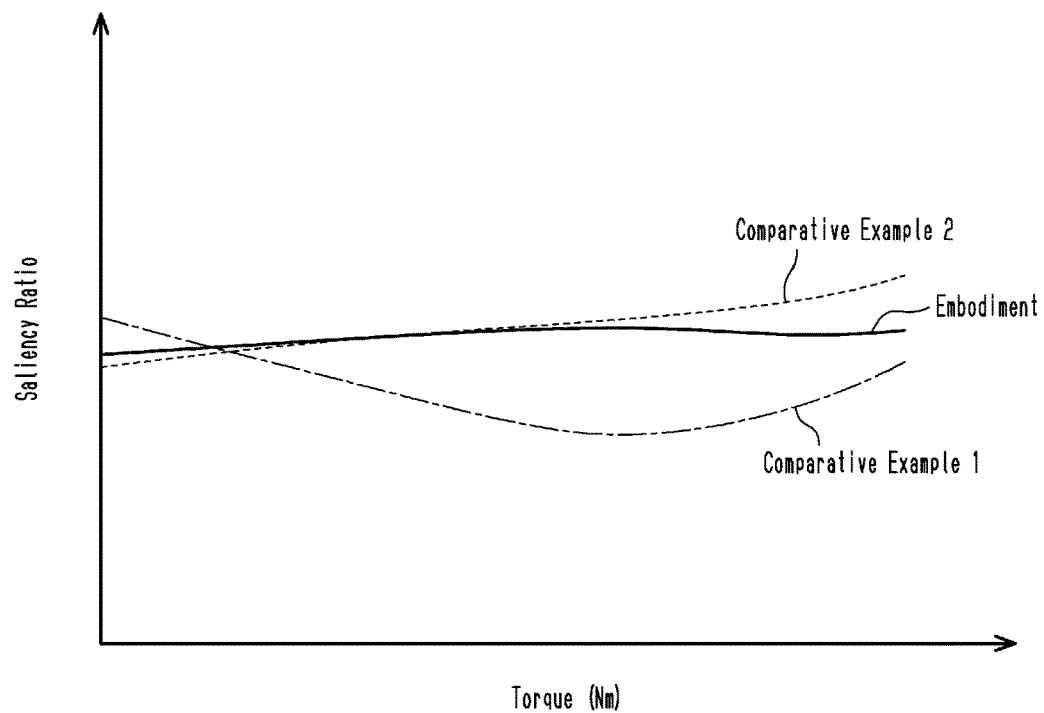
FIG. 10 is a graph showing changes in the saliency ratio in accordance with torque changes in the first embodiment and comparative examples 1 and 2.

Also, as shown in FIG. 10, when torque is greatly changed, the saliency ratio becomes greater in comparative example 2 than the first embodiment. This is considered to be an effect that occurs because magnetism of d-axis is more easily saturated (that is, d-axis inductance Ld is easily decreased) as the opening angle θs of each tooth T (opposing surface Ta) decreases when q-axis current is increased.

The first embodiment has the following advantages.

(1) The projections 24, which project radially outward, are arranged on the outer circumferential portion of the rotor core 21 between the magnetic pole portions 23 having different polarities. In the first embodiment and comparative example 2, in the radial opposing relationship of the rotor core 21 and each tooth T taken at different times while the rotor 14 is revolved once, there is a certain time at which the quantity of teeth T that oppose the magnetic pole portion 23 and do not oppose the projection 24 (teeth in pattern A) is greater than the quantity of teeth T that simultaneously oppose two adjacent magnetic pole portions 23 in the circumferential direction and the projection 24 located in between the magnetic pole portions 23 (teeth T in pattern C). In this manner, decreases in the saliency ratio (Lq/Ld) when current is increased are limited (refer to FIG. 8). As a result, reluctance torque is improved. Also, when the structures of the first embodiment and comparative example 2, which limit decreases in the saliency ratio, are employed in a motor, which performs sensor-less control of a disturbance injection type in place of a position sensor, thereby allowing the motor to be reduced in size, the rotor 14 can be controlled with limited errors in rotation position.

(2) In the first embodiment, in the radial opposing relationship of the rotor core 21 and each tooth T taken at different times while the rotor 14 is revolved once, there is a certain time at which the quantity of teeth T that oppose the magnetic pole portion 23 and do not oppose the projection 24 (teeth in pattern A) becomes equal (two in first embodiment) to the quantity of teeth T that simultaneously oppose two adjacent magnetic pole portions 23 in the circumferential direction and the projection 24 located in between the magnetic pole portions 23 (teeth T in pattern C). In this manner, decreases in saliency ratio caused by increased current are further limited (refer to FIG. 8).

(3) In comparative example 2, in the radial opposing relationship of the rotor core 21 and each tooth T taken at different times while the rotor 14 is revolved once, the quantity of teeth T that oppose the magnetic pole portion 23 and do not oppose the projection 24 (teeth in pattern A) is always greater than the quantity of teeth T that simultaneously oppose two adjacent magnetic pole portions 23 in the circumferential direction and the projection 24 located in between the magnetic pole portions 23 (teeth T in pattern C). In this manner, output of the motor 10 is improved (refer to FIG. 9).

(4) In the first embodiment and comparative example 2, the relationship between the opening angle θs of the opposing surface Ta (radially inner surface) of each tooth T that radially opposes the rotor core 21 and the opening angle θr of each magnetic pole portion 23 satisfies θs<θr. This allows the motor 10 to be configured so that there is a certain time at which the quantity of teeth T that oppose the magnetic pole portion 23 and do not oppose the projection 24 (teeth T in pattern A) is greater than the quantity of teeth T that simultaneously oppose two adjacent magnetic pole portions 23 in the circumferential direction and the projection 24 located in between the magnetic pole portions 23 (teeth T in pattern C).

(5) In the first embodiment and comparative example 2, the motor 10 is configured so that each opening angle between the two adjacent magnetic pole portions 23 in the circumferential direction (inter-magnetic portion opening angle θx) is set to be the same, and the relationship of the inter-magnetic portion opening angle θx and the opening angle θs of the opposing surface Ta of each tooth T satisfies θx<θs. Thus, while the rotor 14 is being rotated, the opposing surface Ta of each tooth T will not oppose only the projection 24. This prevents magnetic flux of the teeth T from entering only the projections 24, thereby limiting decreases in the output.

(6) In the first embodiment and comparative example 2, as viewed in the axial direction, each tooth T is shaped to be straight and has a constant width from the radially outer end to the radially inner end (straight form). In other words, each tooth T of the first embodiment and comparative example 2 is not formed to include a distal end that extends in the circumferential direction as in comparative example 1 (form including extension Tx). This structure limits changes in locations where magnetism is saturated at the distal end (radially inner end) of each tooth T, which opposes the rotor core 21. As a result, decreases in the saliency ratio when current is increased are limited in a further preferred manner. Also, when compared to a structure in which each tooth T includes the extensions Tx as in comparative example 1 and the opening angle θs of the opposing surface Ta of the tooth T is the same, the straightly shaped tooth T in the first embodiment or comparative example 2 obtains sufficient width at the radially intermediate portion of each tooth T. Thus, magnetism saturation at each tooth T is limited and output is improved.

The first embodiment may be changed as described below. The first embodiment and the following modifications can be combined as long as the combined modifications remain technically consistent with each other.

Figure 11:
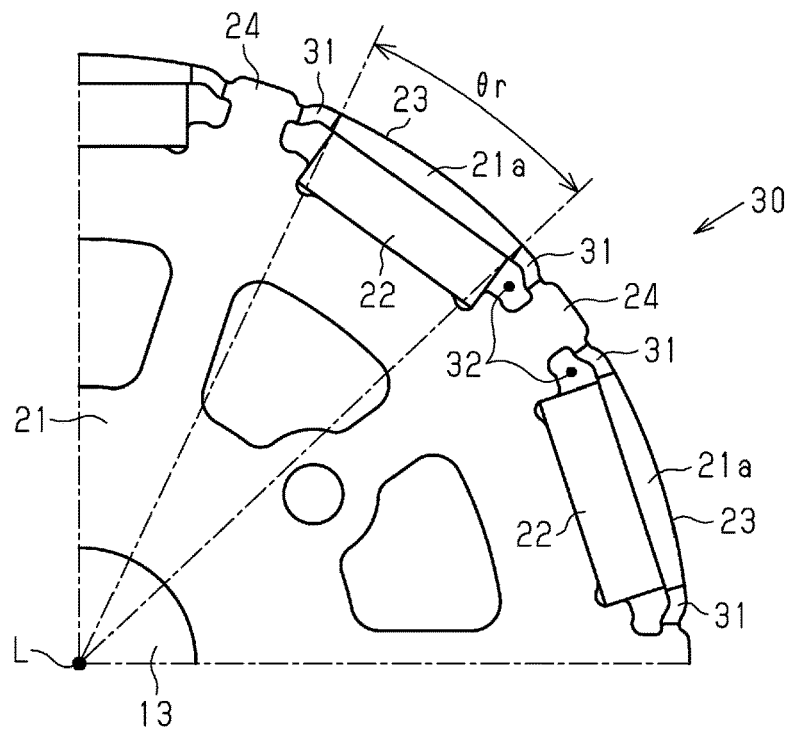
FIG. 11 is a plan view showing part of a rotor according to a modified example.

The rotor 14 of the first embodiment and comparative example 2 may be changed to a rotor 30 shown in FIG. 11. Same reference numerals are given to those components that are the same as the corresponding components of the first embodiment. Such components will not be described. In the rotor 14 of the first embodiment and comparative example 2, a magneto-resistor between a magnetic pole portion 23 and a circumferentially adjacent projection 24 corresponds to the recess 25, which extends radially inward. However, this is changed in the structure shown in FIG. 11. More specifically, in the structure shown in FIG. 11, a portion 21a that is located radially outward from the permanent magnet 22 of the rotor core 21 (magnetic pole portion 23) is integrally connected to the projections 24, which are adjacent to the portion 21a at two opposite sides in the circumferential direction, with bridge portions 31 located in between the portion 21a and the projections 24. In other words, two bridge portions 31 extend from each projection 24 toward the portions 21a of the magnetic pole portions 23 that are located at the two opposite sides of the projection 24 in the circumferential direction, and the bridge portions 31 are connected to the portions 21a of the magnetic pole portions 23. A gap 32 is formed at the radially inner side of each bridge portion 31. Circumferential side surfaces of each permanent magnet 22 are exposed to the gaps 32. Each bridge portion 31 is, for example, compressed in the axial direction or the radial direction and plastically deformed. Thus, the magnetic resistance is higher than other core portions (portion 21a and projection 24), and the bridge portion 31 functions as a magneto-resistor. In this structure, it is preferred that the two circumferential ends of the circumferential surface of each magnetic pole portion 23 (portion 21a), which determine the opening angle θr of the magnetic pole portion 23, be set at boundaries of the magnetic pole portion 23 (portion 21a) and the bridge portions 31, which serve as the magneto-resistors.

In the first embodiment and comparative example 2, portions 21b that are located at two opposite sides of the permanent magnet 22 of the rotor core 21 in the circumferential direction (portions between permanent magnet 22 and recess 25) may be compressed (plastically deformed), for example, in the axial direction or the radial direction to increase the magnetic resistance of the portions 21b.

In the first embodiment and comparative example 2, each tooth T is shaped to be straight (shape with constant width from radially outer end to radially inner end). However, there is no limit to this structure, and the extension Tx of comparative example 1 may be included without changing the opening angle θs of the opposing surface Ta.

The quantity of parts (core segments 15a) that the stator core 15 is separated into is the same as the quantity of teeth T. However, there is no limit to this structure, and the stator core 15 may be formed as an integral component including the annular portion R and the teeth T.

The quantity of polarities of the rotor 14 (quantity of magnetic pole portions 23) and the quantity of slots of the stator 12 (quantity of teeth T) in the first embodiment and comparative example 2 are merely examples and may be changed to 14 polarities and 12 slots, or the like.

A second embodiment of a motor will now be described.

Figure 12A:
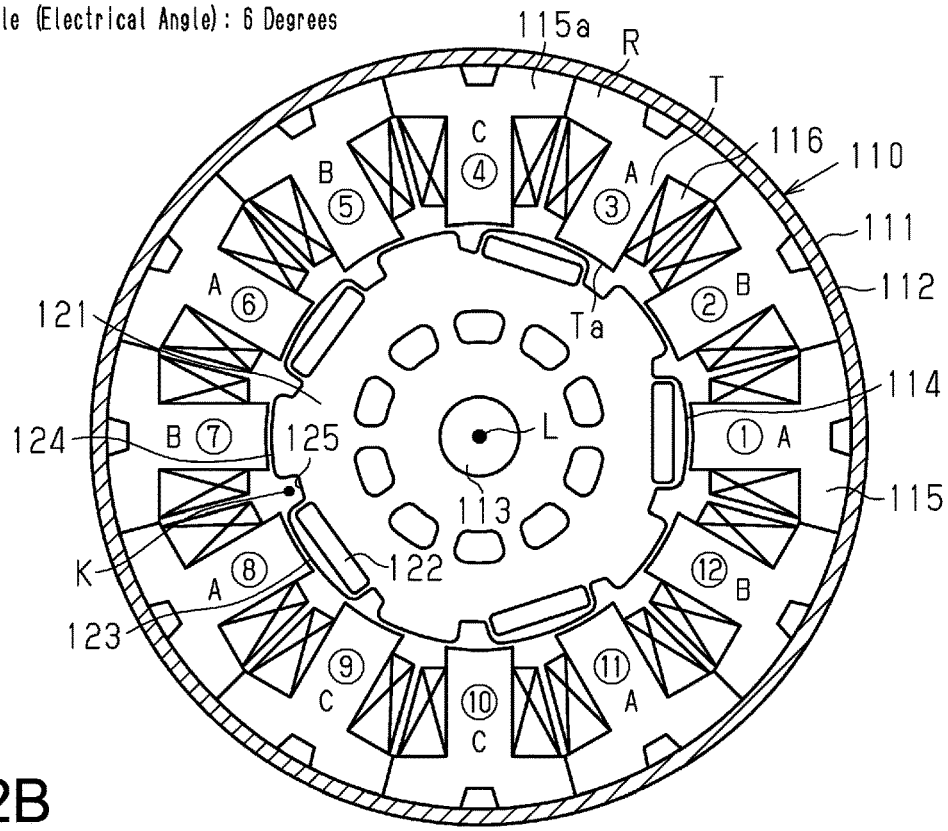
FIG. 12A is a cross-sectional view of a motor according to a second embodiment.

A motor 110 of the second embodiment shown in FIG. 12A is a brushless motor. The motor 110 includes a stator 112, a rotation shaft 113, and a consequent-pole-type rotor 114. The stator 112 is annular and is fixed to an inner circumferential surface of a motor housing 111. The rotation shaft 113 is arranged coaxially with the stator 112. The rotor 114 is located at a radially inner side of the stator 112 and is integrally rotatable with the rotation shaft 113. The rotation shaft 113 is supported by a bearing (not shown) to be rotatable relative to the motor housing 111.

The stator 112 includes an annular stator core 115. The stator core 115 includes an outer circumferential surface that is fixed to the motor housing 111. The stator core 115 is constructed, for example, by stacking core sheets, which are formed by electromagnetic steel sheets, in an axial direction. The stator core 115 includes a tubular annular portion R and teeth T. The annular portion R is fixed to the inner circumferential surface of the motor housing 111. The teeth T are arranged on an inner circumferential surface of the annular portion R and extend radially inward. The quantity of teeth T in the present embodiment (i.e. quantity of slots) is twelve, and the teeth T are shaped identically. In other words, opening angle $\theta s$ of a distal end (radially inner end) of each tooth T, which will be described later, is set to be the same. Further, the teeth T are arranged at equal intervals (30 degree intervals in present embodiment) in the circumferential direction. The stator core 115 of the present embodiment is separated into twelve core segments 115a, one for each tooth T. Each core segment 15a is configured to include one tooth T and part of the annular portion R.

Figure 12B:
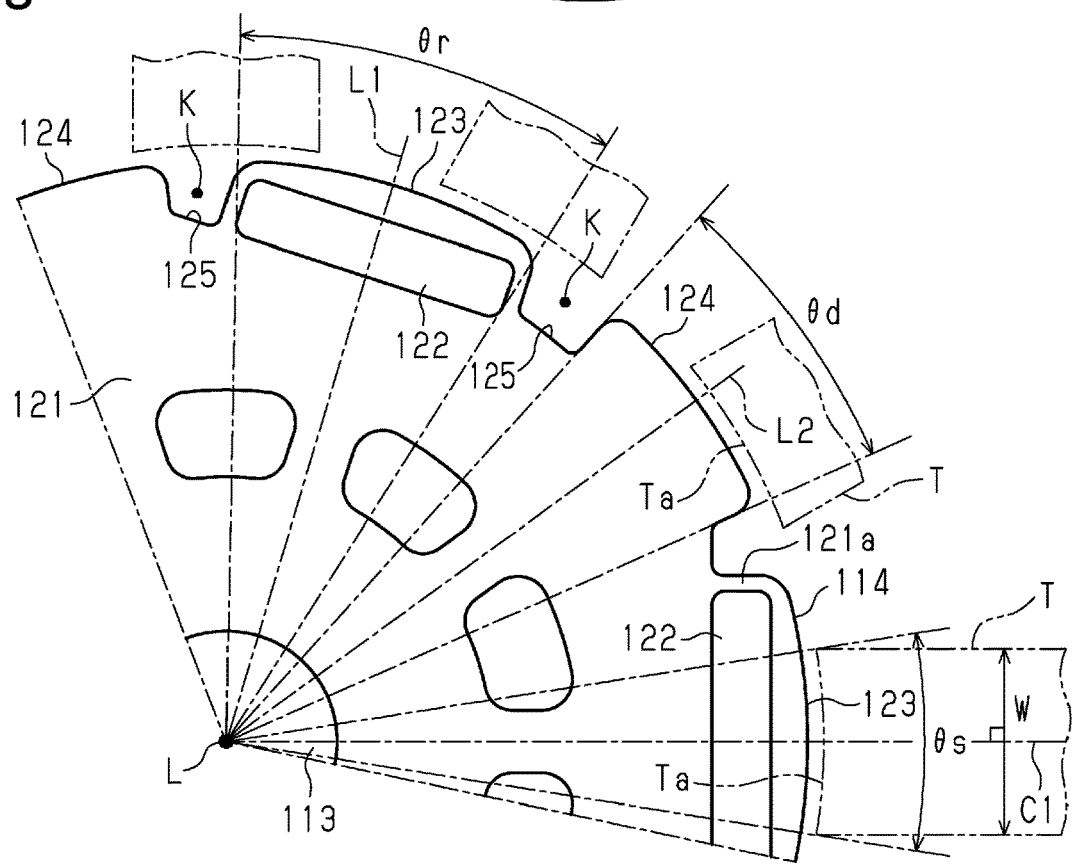
FIG. 12B is a partially enlarged plan view showing a rotor of the second embodiment.

As viewed in the axial direction, each tooth T is shaped to be straight and has a constant width from the radially proximal end (outer end) to the radially distal end (inner end). More specifically, as shown in FIG. 12B, each tooth T is arranged so that width W that is orthogonal to circumferential center line C1 (line extending through circumferential center of tooth T and orthogonally to axis L of rotation shaft 113) is constant in the radial direction. In other words, each tooth T of the present embodiment does not include, for example, an extension extending from the radially inner end of the tooth T toward two opposite sides in the circumferential direction (e.g. extension Tx shown in FIG. 14). Further, a radially inner surface (distal end surface with respect to extension direction) of each tooth T is an opposing surface Ta that opposes an outer circumferential surface of the rotor 114. The opposing surface Ta of each tooth T is an arc-shaped surface that is obtained by extending an arc of a concentric circle about the axis L of the rotation shaft 113 in the axial direction.

Coils 116 of three phases are wound around the teeth T in concentrated winding. When three-phase power supply voltage is applied to the coils 116, a rotating magnetic field is formed in the stator 112. Interaction of the rotating magnetic field and the magnetic field of the rotor 114 rotates the rotor 114.

As shown in FIGS. 12A and 12B, the rotor 114 located at the inner side of the stator 112 includes a substantially tubular rotor core 121. The rotor core 121 is coaxially fixed to the rotation shaft 113. The rotor core 121 is constructed, for example, by stacking core sheets, which are formed by electromagnetic steel sheets, in the axial direction.

The rotor core 121 includes magnetic pole portions 123 and pseudo-magnetic pole portions 124. A permanent magnet 122 is embedded in each magnetic pole portion 123. Each pseudo-magnetic pole portion 124 is a portion of the rotor core 121 and is located relative to the magnetic pole portion 123 with a gap K located in between. The magnetic pole portions 123 and the pseudo-magnetic pole portions 124 are alternately arranged on the outer circumferential portion of the rotor core 121 in the circumferential direction. The present embodiment includes five magnetic pole portions 123 and five pseudo-magnetic pole portions 124. In other words, the quantity of polarities of the rotor 114 (quantity of magnetic pole portions 123) is ten.

The permanent magnet 122 is embedded in a portion of the rotor core 121 that is projecting radially outward (portion between gaps K) to form each magnetic pole portion 123. The magnetic pole portions 123 are identical in shape (shape of permanent magnet 122 and shape of portion in rotor core 121 proximate to permanent magnet 122). In other words, each magnetic pole portion 123 has the same opening angle $\theta r$, which will be described later. The magnetic pole portions 123 are set so that magnetic pole center lines L1 of the magnetic pole portion 23 with respect to the circumferential direction are arranged at equal intervals (72 degree intervals) in the circumferential direction.

The permanent magnet 122 of each magnetic pole portion 123 is substantially box-shaped and its widest surface is orthogonal to the radial direction of the rotor 114. Further, the permanent magnets 122 are arranged so that each magnetic pole surface located at the radially outer side has the same polarity (for example, north). In this manner, each magnetic pole portion 123 has the same polarity (for example, north). Each permanent magnet 122 is, for example, a sintered magnet or a bonded magnet (plastic magnet, rubber magnet, or the like) obtained by mixing magnetic powder with a resin and solidifying the mixture.

Each pseudo-magnetic pole portion 124 formed between the magnetic pole portions 123 in the circumferential direction is a portion of the rotor core 121 that projects radially outward. A recess 125 extends radially inward between a pseudo-magnetic pole portion 124 and an adjacent magnetic pole portion 123 in the circumferential direction. In other words, each pseudo-magnetic pole portion 124 is arranged next to one magnetic pole portion 123 in the circumferential direction with the gap K of a recess 125 arranged in between the pseudo-magnetic pole portion 124 and the magnetic pole portion 123. The pseudo-magnetic pole portions 124 are identically shaped and are arranged at equal intervals (72 degree intervals) in the circumferential direction.

The magnetic flux of the two adjacent magnetic pole portions 123 in the circumferential direction (magnetic flux of permanent magnets 122) results in each pseudo-magnetic pole portion 124 having a polarity differing from the magnetic pole portions 123 (for example, south). The magnetic center line L1 of each magnetic pole portion 123 and magnetic center line L2 of each pseudo-magnetic pole portion 124 are alternately arranged at equal intervals (36 degree intervals) in the circumferential direction.

Dimensional settings (opening angle) of the magnetic pole portions 123, the pseudo-magnetic pole portions 124, and the teeth T in the circumferential direction will now be described.

As shown in FIG. 12B, the opening angle $\theta r$ of each magnetic pole portion 123 is an angular width between two circumferential ends of the circumferential surface of the magnetic pole portion 123 about the axis L. Each pseudo-magnetic pole portion 124 has opening angle $\theta d$ that is an angular width between two circumferential ends of the circumferential surface of the pseudo-magnetic pole portion 124 about the axis L. Further, the opening angle $\theta s$ of each tooth T is an angular width between two circumferential ends of the opposing surface Ta about the axis L. The relationship of the opening angles $\theta r$, $\theta d$, and $\theta s$ satisfies $\theta s < \theta d < \theta r$. It is preferred that the two circumferential ends of the circumferential surface of each magnetic pole portion 123 that determine the opening angle $\theta r$ be set at boundaries of the magnetic pole portion 123 and magneto-resistors (gaps K in recesses 125 in present embodiment), which are adjacent in the circumferential direction. In the same manner as described above, it is preferred that the two circumferential ends of the circumferential surface of each pseudo-magnetic pole portion 124 that determine the opening angle θd be set at boundaries of the pseudo-magnetic pole portion 124 and magneto-resistors (gaps K in recesses 125 in present embodiment), which are adjacent in the circumferential direction.

FIG. 13 is a table that indicates a radial opposing relationship of the rotor core 121 and each tooth T (opposing surface Ta) taken at different times when the rotor 114 is rotated toward one side of the circumferential direction (counterclockwise in FIG. 12A) in the motor 110 of the present embodiment. As shown in FIG. 12A, tooth numbers "1" to "12" are given to the teeth T in order counterclockwise in the circumferential direction so that each tooth T can be described individually. The tooth numbers correspond to the tooth numbers shown in the table of FIG. 13.

The table of FIG. 13 shows which one of patterns "A", "B", and "C" the teeth T having tooth numbers "1" to "12" are in at each position whenever the rotor 114 is rotated counterclockwise by six degrees in electrical angle (1.2 degrees in mechanical angle). The table of FIG. 13 also shows the teeth quantities of pattern A to C at each position (rotational angle). In pattern A, the opposing surface Ta of the tooth T opposes the magnetic pole portion 123 and does not oppose the pseudo-magnetic pole portion 124. In pattern B, the opposing surface Ta of the tooth T opposes the pseudo-magnetic pole portion 124 and does not oppose the magnetic pole portion 123. In pattern C, the opposing surface Ta of the tooth T simultaneously opposes the magnetic pole portion 123 and the pseudo-magnetic pole portion 124 that are arranged next to each other in the circumferential direction.

FIG. 12A shows the motor 110 when the rotational angle (electrical angle) of the rotor 114 is 6 degrees. In this case, the tooth T having tooth number "1" fully opposes a magnetic pole portion 123 (circumferential center of tooth T coincides with circumferential center of magnetic pole portion 123). Further, the tooth T having tooth number "7" fully opposes a pseudo-magnetic pole portion 124 (circumferential center of tooth T coincides with circumferential center of pseudo-magnetic pole portion 124). In this opposing relationship of each tooth T and the rotor core 121, the teeth T having tooth numbers "1", "3", "6", "8", and "11" are in pattern A, the teeth T having tooth numbers "2", "5", "7", and "12" are in pattern B, and the teeth T having tooth numbers "4", "9", and "10" are in pattern C. In other words, the teeth quantities of patterns A to C are 5, 4, and 3, respectively. The teeth quantities of patterns A to C remain the same while the rotor 114 is revolved once (360 degrees) in electrical angle. The rotor 114 of the present embodiment is formed by ten polarities. Thus, five revolutions in electrical angle (1800 degrees) correspond to one revolution in mechanical angle of the rotor 114.

Figure 14:
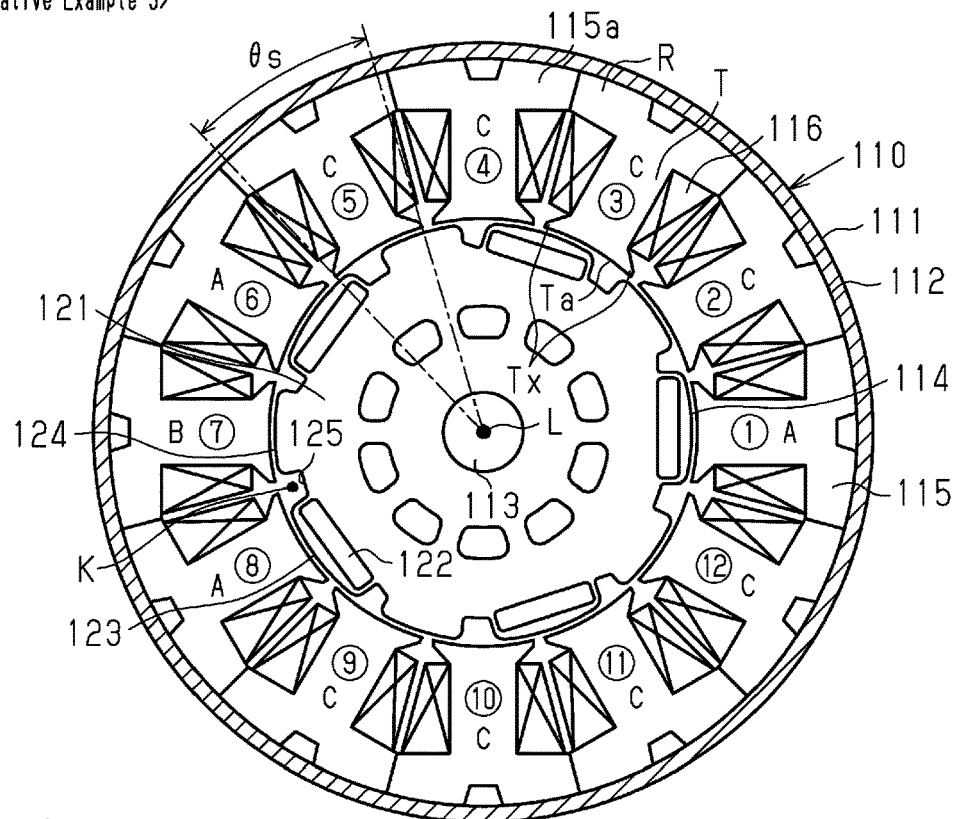
FIG. 14 is a cross-sectional view of a motor according to comparative example 3.

FIG. 14 shows the structure of comparative example 3, in which the opening angle θs of opposing surface Ta of each tooth T is increased from the present embodiment. The comparative example 3 uses the same rotor 114 as the present embodiment. In the structure of comparative example 3, the relationship of the opening angle θr of the magnetic pole portion 123, the opening angle θd of the pseudo-magnetic pole portion 124, and the opening angle θs of each tooth T satisfies θd<θs<θr. Further, each tooth T of comparative example 3 includes extensions Tx that extend from the radially inner end toward two opposite sides of the circumferential direction. This extension Tx widens the opposing surface Ta (opening angle θs) that opposes the rotor core 121.

In a state shown in FIG. 14, in the opposing relationship of each tooth T and the rotor core 121, the three teeth T having tooth numbers "1", "6", and "8" are in pattern A, the one tooth T having tooth number "7" is in pattern B, and the eight teeth T having tooth numbers "2", "3", "4", "5", "9", "10", "11", and "12" are in pattern C. The teeth quantities of patterns A to C are respectively 3, 1, and 8, and remain the same while the rotor 114 is revolved once.

The operation of the second present embodiment will now be described.

The teeth T that simultaneously oppose the magnetic pole portion 123 and the pseudo-magnetic pole portion 124 (pattern C) form a magnetic path that short-circuits the magnetic pole portion 123 and the pseudo-magnetic pole portion 124. Thus, in comparative example 3 in which the teeth quantity in pattern C is relatively large, q-axis inductance Lq is easily decreased when d-axis current is input. In contrast, in the present embodiment, the teeth quantity in pattern C is decreased and the teeth quantity in pattern A is increased. This limits decreases in q-axis inductance Lq when d-axis current is input. As a result, decreases in the saliency ratio are limited.

Figure 15:
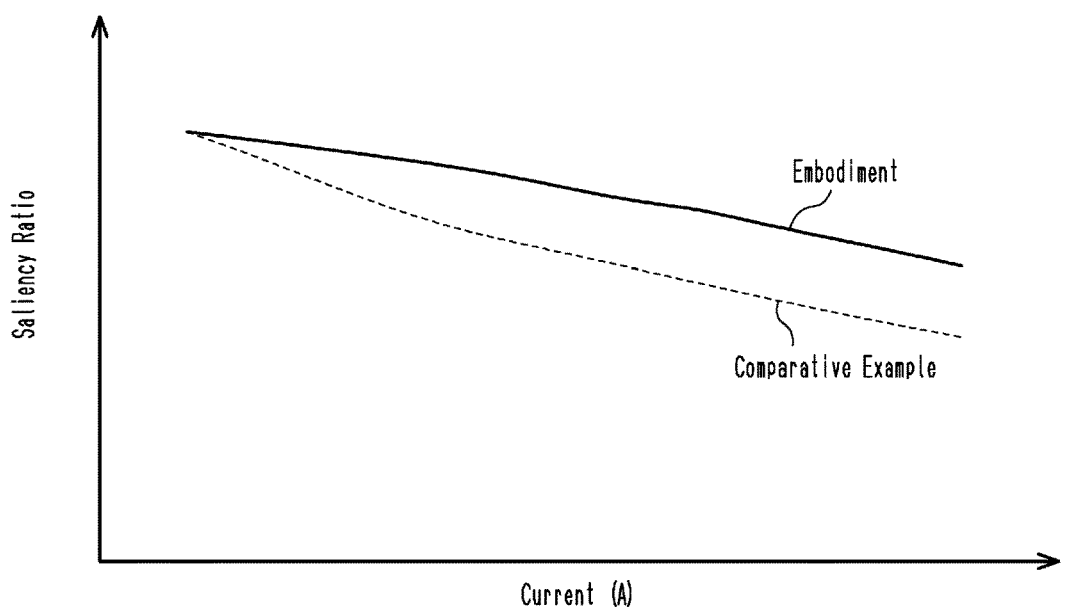
FIG. 15 is a graph showing changes in the saliency ratio in accordance with current changes in the second embodiment and comparative example 3.

As shown in FIG. 15, when the current supplied to the coils 116 is increased, the degree of decrease in the saliency ratio (Lq/Ld) of q-axis inductance Lq to d-axis inductance Ld is smaller in the present embodiment than comparative example 3.

Figure 16:
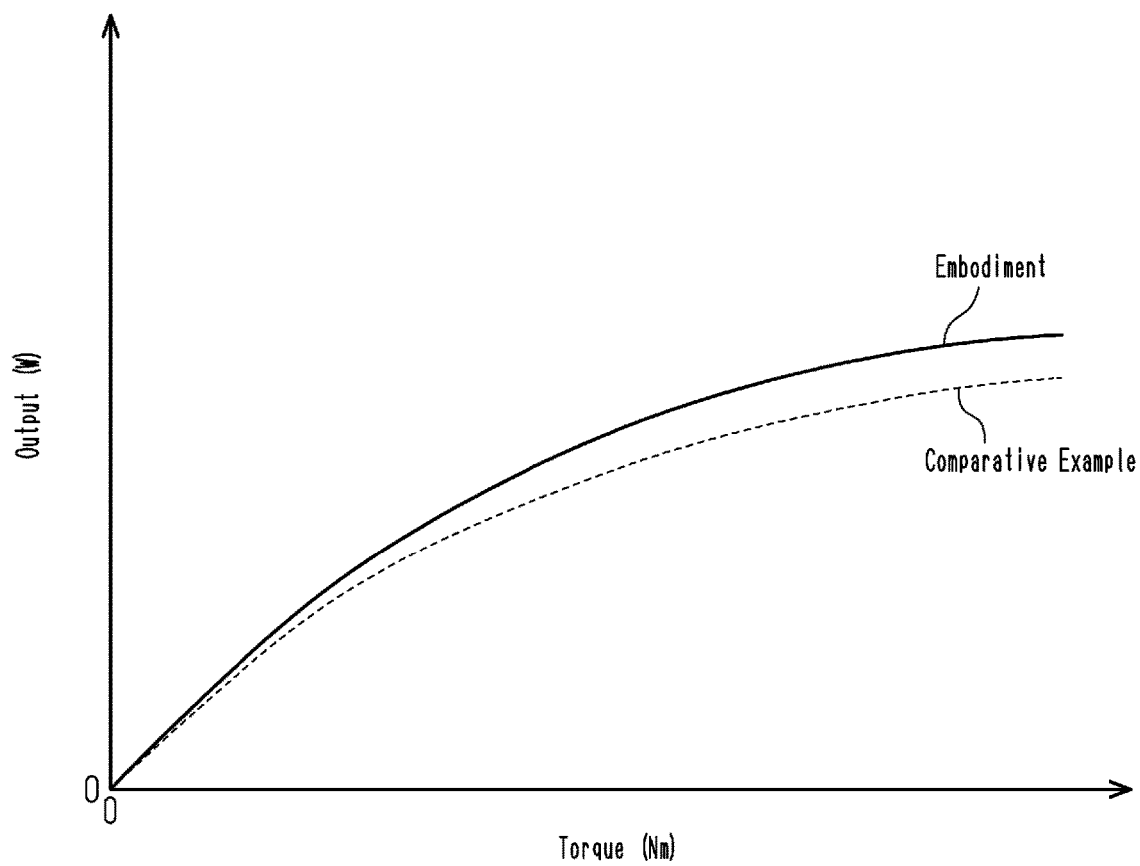
FIG. 16 is a graph showing changes in output in accordance with torque changes in the second embodiment and comparative example 3.

Also, as shown in FIG. 16, the output (rotational speed at same torque) is higher in the present embodiment than comparative example 3. It is considered that this improvement resulted from the effect of further limiting decreases in the saliency ratio in the embodiment than comparative example 3 when current is increased.

The second embodiment has the following advantages.

(7) In the radial opposing relationship of the rotor core 121 and each tooth T taken at different times while the rotor 114 is revolved once, there is a certain time at which the quantity of teeth T that oppose the magnetic pole portion 123 and do not oppose the pseudo-magnetic pole portion 124 (teeth T in pattern A) is greater than the quantity of teeth T that simultaneously oppose the magnetic pole portion 123 and the pseudo-magnetic pole portion 124, which are arranged next to each other in the circumferential direction (teeth T in pattern C). This limits decreases in the saliency ratio (Lq/Ld, refer to FIG. 15). As a result, reluctance torque is improved. Also, when relatively low field current (d-axis current) is input, magnetic flux leaking to the pseudo-magnetic pole portion 124 is limited thereby allowing for high-speed rotation driving.

(8) In the radial opposing relationship of the rotor core 121 and each tooth T taken at different times while the rotor 114 is revolved once, the quantity of teeth T that oppose the magnetic pole portion 123 and do not oppose the pseudo-magnetic pole portion 124 is always greater than the quantity of teeth T that simultaneously oppose the magnetic pole portion 123 and the pseudo-magnetic pole portion 124, which are arranged next to each other in the circumferential direction. This further limits decreases in the saliency ratio.

(9) The motor 110 is configured so that the relationship of the opening angle θr of the magnetic pole portion 123, the opening angle θd of the pseudo-magnetic pole portion 124, and the opening angle θs of the opposing surface Ta of each tooth T satisfies θs<θd<θr. In this mode, the motor 110 is configured so that there is a certain time at which the quantity of teeth T that oppose the magnetic pole portion 123 and do not oppose the pseudo-magnetic pole portion 124 is greater than the quantity of teeth T that simultaneously oppose the magnetic pole portion 123 and the pseudo-magnetic pole portion 124, which are arranged next to each other in the circumferential direction.

(10) In the radial opposing relationship of the rotor core 121 and each tooth T taken at different times while the rotor 114 is revolved once, there is a certain time at which the quantity of teeth T that oppose the pseudo-magnetic pole portion 124 and do not oppose the magnetic pole portion 123 (teeth T in pattern B) is greater than the quantity of teeth T that simultaneously oppose the magnetic pole portion 123 and the pseudo-magnetic pole portion 124, which are arranged next to each other in the circumferential direction (teeth T in pattern C). This further limits decreases in the saliency ratio.

(11) As viewed in the axial direction, each tooth T has a constant width from the radially outer end to the radially inner end (straightly shaped). In other words, each tooth T of the present embodiment is not shaped to include a distal end that extends in the circumferential direction as in comparative example 3 (shaped to include extension Tx). This structure limits changes in locations where magnetism is saturated at the distal end (radially inner end) of each tooth T, which opposes the rotor core 121. As a result, decreases in the saliency ratio are limited in a further preferred manner. Also, when compared to a structure in which the teeth T each includes an extension Tx as in comparative example 3 and the opening angle θs of each opposing surface Ta is the same, the straightly shaped tooth T of the above embodiment obtains sufficient width at the radially intermediate portion of each tooth T. Thus, magnetism saturation at each tooth T is limited and output is improved.

The second embodiment may be changed as described below. The present embodiment and the following modifications can be combined as long as the combined modifications remain technically consistent with each other.

In the second embodiment, portions 121a that are located at two opposite sides of the permanent magnet 122 of the rotor core 121 in the circumferential direction (portions between permanent magnet 122 and gaps K) may be compressed (plastically deformed), for example, in the axial direction or the radial direction to increase the magnetic resistance of the portion 121a.

In the second embodiment, each tooth T is shaped to be straight (shaped to have constant width from radially outer end to radially inner end). However, there is no limit to this structure, and the extension Tx such as that in comparative example 3 may be employed without changing the opening angle θs of the opposing surface Ta.

The quantity of parts that the stator core 115 is separated into is the same as the quantity of teeth T (formed by core segments 115a). However, there is no limit to this structure, and the stator core 115 may be formed as an integral component including the annular portion R and the teeth T.

In the second embodiment, the teeth quantities of patterns A to C while the rotor 114 is being rotated are 5, 4, and 3, respectively. However, this is no limit to such an arrangement, and the teeth quantities of patterns A to C may respectively be, for example, 4, 5, and 3.

The quantity of polarities of the rotor 114 (quantity of magnetic pole portions 123) and the quantity of slots of the stator 112 (quantity of teeth T) in the second embodiment are merely examples and may be changed to 14 polarities and 12 slots, or the like.

The invention claimed is:
1. A motor, comprising:
a rotation shaft;
a rotor including a rotor core, which is coaxially fixed to the rotation shaft, and magnetic pole portions respectively including permanent magnets embedded in the rotor core, the magnetic pole portions having polarities that differ alternately in a circumferential direction; and
a stator including teeth, which are arranged in the circumferential direction opposing an outer circumferential surface of the rotor core in a radial direction, and a coil wound around the teeth, wherein
a projection projecting radially outward from an outer circumferential portion of the rotor core is arranged between the magnetic pole portions having different polarities,
in a radial opposing relationship of the rotor core and the teeth taken at different times while the rotor is revolved once, at a certain time, a quantity of the teeth that oppose one of the magnetic pole portions and do not oppose the projection is greater than a quantity of the teeth that simultaneously oppose two of the magnetic pole portions adjacent to each other in the circumferential direction and the projection located in between the magnetic pole portions, and
in the radial opposing relationship of the rotor core and the teeth taken at different times while the rotor is revolved once, at a certain time, the quantity of the teeth that oppose one of the magnetic pole portions and do not oppose the projection is the same as the quantity of the teeth that simultaneously oppose two of the magnetic pole portions adjacent to each other in the circumferential direction and the projection located in between the magnetic pole portions.

2. The motor according to claim 1, wherein
the magnetic pole portions are set to have the same opening angle θr,
the teeth include opposing surfaces that oppose the rotor core in the radial direction and are set to have the same opening angle θs, and
the opening angle θs of the opposing surfaces of the teeth and the opening angle θr of the magnetic pole portions are in a relationship satisfying θs<θr.

3. The motor according to claim 2, wherein the magnetic pole portions adjacent to each other in the circumferential direction are set so that an opening angle θx in between the magnetic pole portions is the same, and the opening angle θx and the opening angle θs of the opposing surfaces of the teeth are in a relationship satisfying θx<θs.

4. The motor according to claim 1, wherein the teeth each have a constant width from a radially outer end to a radially inner end as viewed in an axial direction.

5. A motor, comprising:
a rotation shaft;
a rotor including a rotor core coaxially fixed to the rotation shaft; and
a stator including teeth, which are arranged in a circumferential direction opposing an outer circumferential surface of the rotor core in a radial direction, and a coil wound around the teeth, wherein
the rotor core includes magnetic pole portions, each having an embedded permanent magnet, and pseudo-magnetic pole portions, which are formed by portions of the rotor core and are each located relative to the magnetic pole portion with a gap located in between,
the magnetic pole portions and the pseudo-magnetic pole portions are alternately arranged on an outer circumferential portion of the rotor core in the circumferential direction, the magnetic pole portions have the same polarity and the pseudo-magnetic pole portions are magnetic poles having polarities differing from the magnetic pole portions, in a radial opposing relationship of the rotor core and the teeth taken at different times while the rotor is revolved once, at a certain time, a quantity of the teeth that oppose one of the magnetic pole portions and do not oppose the pseudo-magnetic pole portions is greater than a quantity of the teeth that simultaneously oppose one of the magnetic pole portions and one of the pseudo-magnetic pole portions arranged that are next to each other in the circumferential direction, the magnetic pole portions are set to have the same opening angle θr, the pseudo-magnetic pole portions are set to have the same opening angle θd, the teeth include opposing surfaces that oppose the rotor core in the radial direction and have the same opening angle θs, and the opening angles θr, θd, and θs are in a relationship satisfying θs<θd<θr.

6. The motor according to claim 5, wherein in the radial opposing relationship of the rotor core and the teeth taken at different times while the rotor is revolved once, the quantity of the teeth that oppose one of the magnetic pole portions and do not oppose the pseudo-magnetic pole portions is always greater than the quantity of the teeth that simultaneously oppose one of the magnetic pole portions and one of the pseudo-magnetic pole portions that are arranged next to each other in the circumferential direction.

7. The motor according to claim 5, wherein in the radial opposing relationship of the rotor core and the teeth taken at different times while the rotor is revolved once, at a certain time, a quantity of the teeth that oppose one of the pseudo-magnetic pole portions and do not oppose the magnetic pole portions is greater than the quantity of the teeth that simultaneously oppose one of the magnetic pole portions and one of the pseudo-magnetic pole portions that are arranged next to each other in the circumferential direction.

8. The motor according to claim 5, wherein the teeth each have a constant width from a radially outer end to a radially inner end as viewed in an axial direction.

* * * * *